Nov. 6, 1951 — A. J. KERCHER — 2,573,846
ELECTRIC LOAD REGULATOR
Filed Oct. 10, 1949 — 3 Sheets-Sheet 1

INVENTOR,
ARTHUR J. KERCHER
BY John Flam
ATTORNEY

Nov. 6, 1951 — A. J. KERCHER — 2,573,846
ELECTRIC LOAD REGULATOR
Filed Oct. 10, 1949 — 3 Sheets-Sheet 2
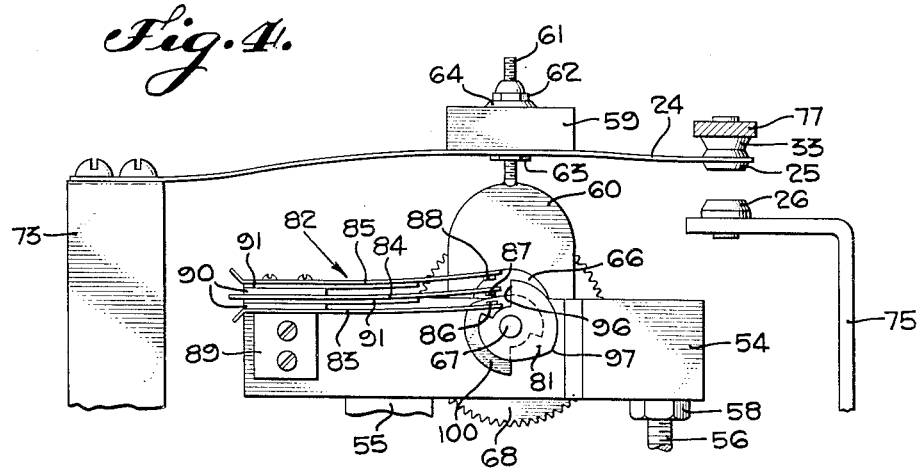
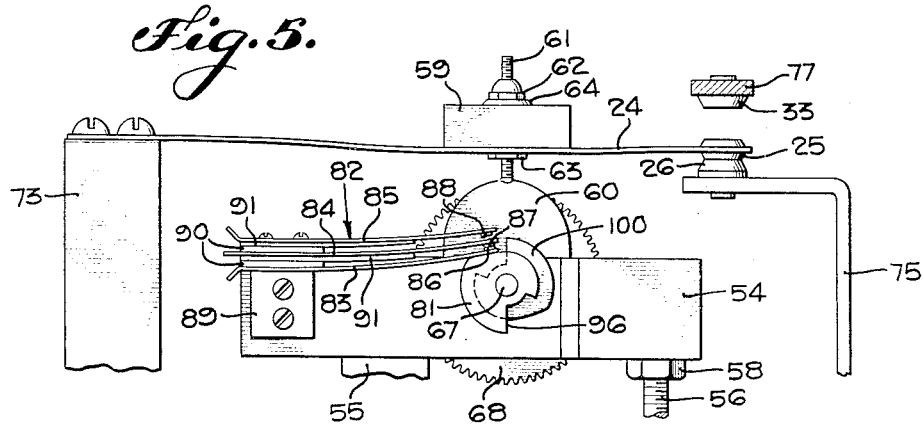
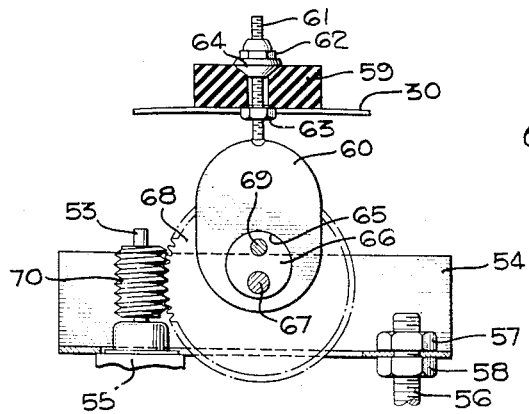
INVENTOR,
ARTHUR J. KERCHER
BY John Flam
ATTORNEY

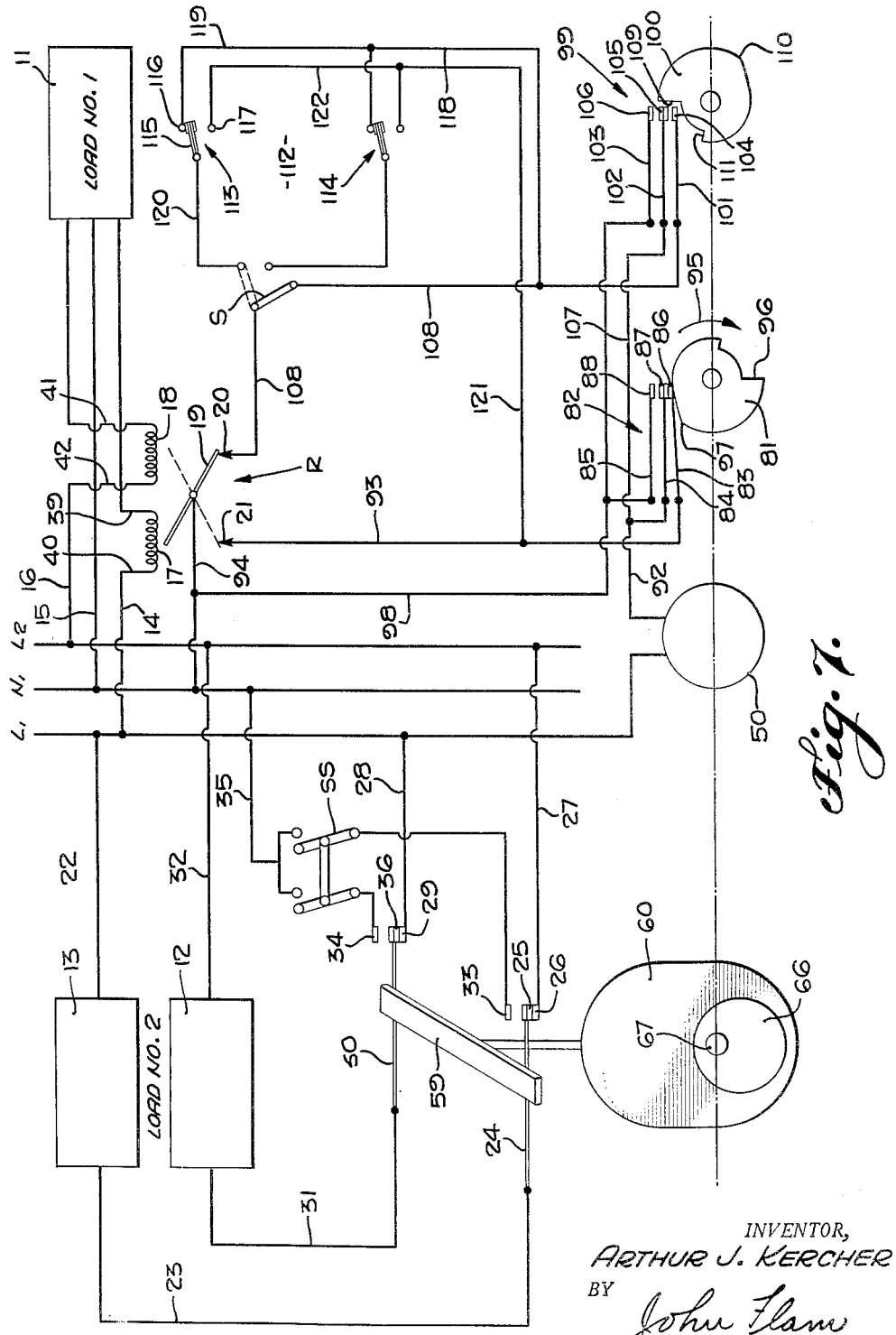

Patented Nov. 6, 1951

2,573,846

UNITED STATES PATENT OFFICE 2,573,846

ELECTRIC LOAD REGULATOR

Arthur J. Kercher, Berkeley, Calif., assignor of one-half to W. Wesley Hicks, San Francisco, Calif.

Application October 10, 1949, Serial No. 120,510

21 Claims. (Cl. 171—97)

This invention relates to the regulation of electric power loads.

This application is a continuation in part of application, Serial No. 33,082, filed June 15, 1948, now Patent No. 2,521,171, issued September 5, 1950, in the name of Arthur J. Kercher and entitled: Electric Load Regulator.

There are many electric installations furnishing power for the operation of the usual household needs, such as electric lights, electric ranges, and electric water heaters. In addition, infrequent power consumption is required for household appliances, such as ironing and washing machines, fans, and refrigerators.

A persistent problem encountered in such installations is that the load varies between wide limits—from a very light load in the daytime when no cooking is done and hot water is little used, to a very heavy load in the evening when the electric range and water heater are in use. This condition is still further aggravated when electric room heaters provide a part of the load.

It is one of the objects of this invention to make it possible to reduce part of the load without serious inconvenience to the user. More particularly, it is an object of this invention to reduce the space heater load when either the load demand for the remainder of the installation is heavy, or when external temperature conditions are such that the space heater load may be reduced without serious inconvenience.

Not only is the load factor improved in this manner, but power is conserved. In periods of power shortages, this conservation is of considerable importance, and increasing the load factor necessarily reduces the cost of supplying a given amount of energy.

In order to reduce the space heating load in accordance with this invention, the electromotive force supplying the space heaters is reduced. This can be effectively done, especially when a three-wire system is used having a neutral wire of intermediate electromotive force with respect to the other two lines. Normally, the space heating equipment is supplied from the two leads having a maximum electromotive force between them. When the load for the rest of the system is heavy, or when external temperature conditions are permissive, the space heaters are connected between the neutral conductor and one of the other leads. With 240 volt three-wire systems, the reduced voltage is 120, thereby reducing the space heating load to one-fourth. It is not feasible to reduce the voltage applied to the remainder of the load, such as lighting or cooking; therefore, the invention contemplates reducing the load where it may best be tolerated, as for space heating.

It is, accordingly, another object of this invention to make it possible to reduce the power consumption of a part of the system without affecting the remainder of the load by reducing the voltage across the said part.

It is particularly a further object of this invention to provide novel and improved switching means to accomplish these results automatically and efficiently.

It is still a further object of this invention to provide improved switching means that operates noiselessly and that requires but little maintenance. To accomplish these purposes, use is made of a small motor that will operate the switching means slowly, reducing wear on the contacts as well as arcing.

It is a still further object of this invention to provide novel and improved circuit means to operate a motor driven switch.

This invention possesses many other advantages, and has other objects which may be made more clearly apparent from a consideration of one embodiment of the invention. For this purpose there is shown a form in the drawings accompanying and forming part of the present specification. The form will now be described in detail illustrating the general principles of the invention; but it is to be understood that this detailed description is not to be taken in a limiting sense, since the scope of the invention is best defined by the appended claims.

Referring to the drawings:

Fig. 4 is an enlarged, fragmentary sectional view, taken along a plane corresponding to line 4—4 of Fig. 1;

Fig. 5 is a view similar to Fig. 4, but showing an alternate position of the apparatus;

Fig. 6 is an enlarged, fragmentary sectional view, taken along a plane corresponding to line 6—6 of Fig. 1; and Fig. 7 is a wiring diagram illustrating the manner in which the apparatus can be utilized in a system.

Figure 1:
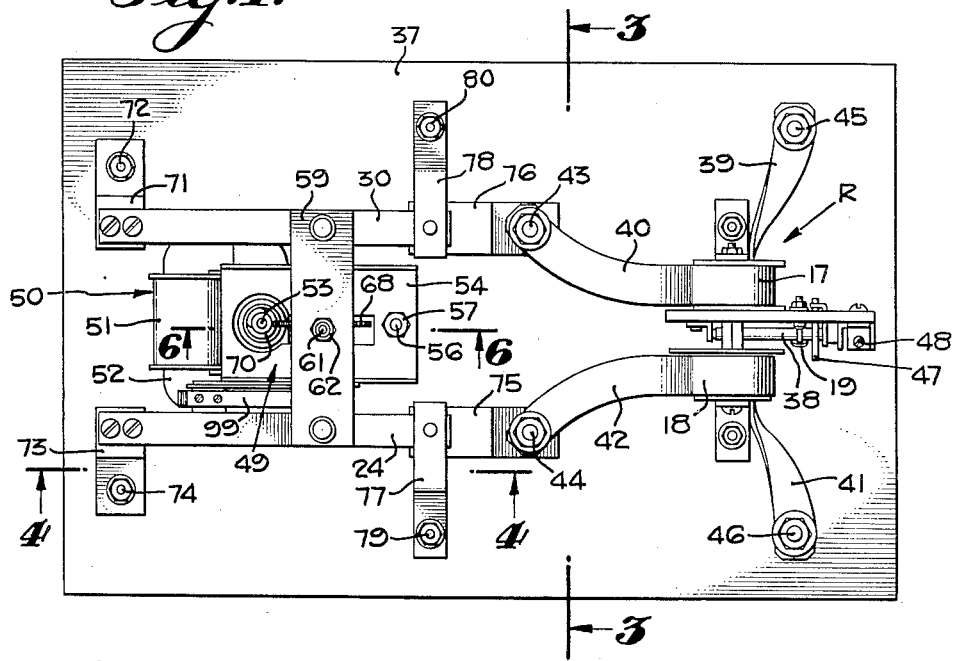
Figure 1 is a top plan view of an apparatus incorporating the invention.

As shown most clearly in Fig. 7, a three wire system is illustrated. In this system line 1 and line 2, as well as the neutral connection N, are intended to be supplied from a commercial source of electrical energy, such as a 240 volt system. The electromotive force between the lines 1 and 2 may, for example, be 240 volts and the potential difference between either line 1 or 2 and the neutral connection N is one-half of that, or 120 volts.

Load No. 1, shown by the rectangle 11, may comprise, in the usual household installation, electricity consuming devices, such as a range, lights, water heater, refrigerator, and the like. Another load, shown by the two rectangles 12 and 13, may comprise room heater loads. No attempt is made to illustrate the various circuit controlling devices for energizing at will any parts of these loads, since they may be a part of the system diagrammatically illustrated by the rectangles.

Load No. 1 is shown as supplied through the conductors 14, 15, and 16 from the three lines of the system. In the outside lines 14 and 16 are included current coils 17 and 18. These current coils, together with a contact arm 19 and front and back contact points 20 and 21, form a current relay R responding to the combined load furnished to load 1. While the load is below a predetermined value, the contact arm 19 is urged, as by a light spring, to the full-line position shown in the wiring diagram. Under such circumstances full voltage across lines 1 and 2 may be supplied to operate load No. 2.

Thus, for example, that portion of load No. 2 which is indicated by rectangle 13 is supplied from line 1, through a connection 22 to load 13, a connection 23, a rigid switch arm 24, contact 25 carried by the arm 24, a stationary contact 26, and connection 27 to line 2.

Similarly, that portion of load No. 2 represented by the rectangle 12 may be supplied from line 2 through connection 32, the load 12, connection 31, rigid switch arm 30, contact 36 on arm 30, stationary contact 29, and connection 28 to line 1.

When the demand of load No. 1 reaches a predetermined value, current coils 17 and 18 in combination move the contact arm 19 toward the dotted line position. This contact arm leaves contact 20 and engages contact 21. By the apparatus to be hereinafter described, this change in connections causes the switch arms 24 and 30 to make connections with the stationary contacts 33 and 34.

Since both of these contacts 33 and 34 are connected to the neutral lead by connection 35, by the aid of a double pole switch SS, load No. 2 is then supplied with half of the voltage between lines 1 and 2, and the load is thereby reduced to twenty-five per cent.

The circuit for that portion of the load represented by rectangle 13 can be traced from line 1 through connection 22, the load 13, connection 23, switch arm 24, contacts 25 and 33, the switch SS, and connection 35 to neutral. Similarly, the circuit for that portion of the load corresponding to rectangle 12 can be traced from line 2, connection 32, load 12, connection 31, arm 30, contacts 36 and 34, switch SS, and connection 35 to neutral.

Figure 2:
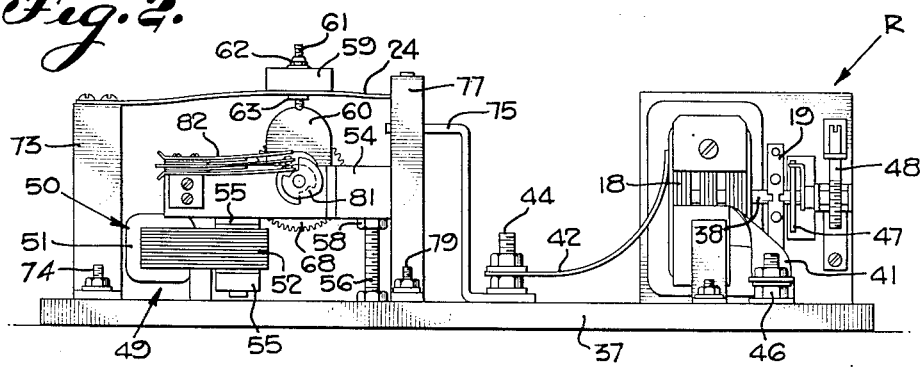
Fig. 2 is a side view thereof.

In Figs. 1 and 2, the current relay R is shown as mounted on a base 37 made from insulation material. Contact arm 19 is shown as mounted on a rotatable shaft 38 which is connected to a rotor influenced by the coils 17 and 18. Connections 39 and 40 for coil 17 are attached to the posts 45 and 43, mounted on base 37. Similarly, connections 41 and 42 are connected to terminal posts 46 and 44. A light helical spring 47, mounted on shaft 38, serves to urge the arm 19 to the position indicated in full lines in Fig. 7. Adjustment of the current relay R can be effected in any conventional manner, as by the aid of a screw 48 which may adjust the force of the spring 47. Since this form of apparatus is well known, further discussion of the mechanical details is unnecessary.

The switch arm 30 may be made of copper, and its left-hand end is mounted on a post 71 which is connected to a terminal post 72 by the aid of which connection 31 may be effected. Arm 24 is entirely similar in structure to arm 30. Its left-hand end is connected to a post 73 which is connected to terminal post 74 by the aid of which connection 23 may be effected (Fig. 7).

Figure 3:
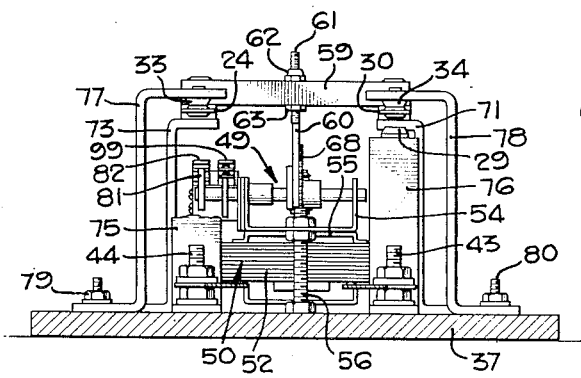
Fig. 3 is a sectional view, taken along a plane corresponding to line 3—3 of Fig. 1.

The lower stationary contacts 26 and 29 (see Figs. 3, 4, and 5) are mounted on conducting brackets 75 and 76, and connected to the terminal posts 44 and 43 respectively (Fig. 1). The contacts 33 and 34 are mounted on brackets 77 and 78 respectively extending over the brackets 75 and 76 and having downwardly extending legs connected to terminal posts 79 and 80. These terminal posts 77 and 78 may be mounted upon base 37, and connections may be appropriately made therefrom to the switch SS (Fig. 7) and thence to neutral.

Let it be assumed that the current through coils 17 and 18 reach a value such as to move the contact arm 19 to the dotted line position in Fig. 7. This causes operation of a motor mechanism 49 to move the arms 24 and 30 from the position illustrated in Figs. 5 and 7 to the position illustrated in Fig. 4, in a manner to be hereinafter described.

The motor mechanism 49 includes a motor 50 (Fig. 2) which may be of the conventional self-starting type. The motor may be appropriately mounted on the base 37. The motor comprises an operating winding 51, a core 52, and a shaft 53 (Fig. 6) connected with the rotor.

A channel shaped member 54 (Figs. 4 and 5) is adapted to support that part of the motor mechanism 50 which moves the arms 24 and 30 either to the high voltage position or to the low voltage position, corresponding respectively to lower or upper contacting position. This channel member 54 may be secured to the base 37 as by the aid of a bracket 55 which may in turn be secured to the core 52, of the motor 50. Also securing the channel 54 is a bolt 56 (Figs. 2 and 6) extending from the base 37 and through an appropriate aperture in the bottom of the channel 54, together with nuts 57 and 58 on each side of the bottom of the channel 54, and threadedly engaging the bolt 56.

As shown most clearly in Figs. 1 and 6, the arms 24 and 30 are joined together by a block 59 of insulation material. Centrally of the block 59 and depending therefrom toward the channel 54 is a connecting link member 60. This member 60 is secured to the block 59 by the aid of a stud 61 integrally formed with member 60 and extending through the block 59 and secured thereto as by the aid of nuts 62 and 63. Between the nut 63 and the block 59 may be provided a substantially hemispherically shaped bearing 64 to provide a universal type joint between the linkage member 60 and the block 59.

The member 60 is provided with a circular aperture 65. Cooperating with this aperture 65 is an eccentric 66 rotating about a shaft 67 which shaft is appropriately supported for rotation by extending through the sides of the channel 54.

A gear 68 may be provided on the shaft, as by being attached thereto, and to this gear 68 may be secured the eccentric 66, as by the aid of a machine screw 69. The gear 68 may be placed adjacent the member 60, forming a restraining shoulder therefor, and the eccentric 66 may also be provided with a shoulder similarly insuring that the proper relationship exists between the member 60 and the eccentric 66.

The gear 68 is adapted to be rotated by a worm 70, which is secured to the shaft 53 of the motor 50, the shaft 53 extending through the bottom of the channel 54.

It is therefore readily apparent that the motor 50, when energized, will cause the eccentric 66 to reciprocate the member 60 through appropriate gear reduction mechanisms, and thereby move the block 58 and the arms 24 and 30 between upper and lower contacting positions.

The time necessary to complete a half-cycle of operation, that is, for instance, from the lower contacting position to upper contacting position, may be of the order of one-fortieth of a second. By the eccentric driving mechanism, the traverse is a smooth one, and therefore substantially noiseless. The time for such an operation being relatively slow, as compared, for instance, with a snap action, there will be little wear on the contacts, and inappreciable arcing. The switching mechanism will therefore require negligible maintenance, and will be of long life.

When the relay arm 19 first causes energization of the motor 50 in response to an increased load, provisions are made such that the motor operates to complete that half cycle in which switch arms 24 and 30 move from lower contacting position to upper contacting position. For this purpose, a cam member 81 is shown as mounted on the shaft 67 (Fig. 5) exterior of the channel member 54. This cam 81 will necessarily assume an angular position about the shaft 67 according to the position of the eccentric 66, and thus a definite angular position for every position of the arms 24 and 30 with respect to the stationary contacts.

A circuit controller mechanism 82 is conditioned by this cam 81. It comprises three spring contact arms 83, 84, and 85 having contacts 86, 87, and 88 respectively. These arms are insulatedly supported on a block 89 which may in turn be attached to the side of the channel member 54. These arms 83, 84, and 85 are mounted one above the other, and spaced by insulation material 90 at the supporting block 89. Short spring arms 91 serve to impose a resilient force upon contact arms 84 and 85 in such manner as to support them in spaced relation when they are unrestrained as in Fig. 4.

In the free position of these arms, as illustrated most clearly in Fig. 4, all of the contacts are out of engagement with each other. However, when the arms 24 and 30 are in their lower contacting position, the cam 81 is in such an angular position that contacts 86 and 87 are in contact closing relation, conditioning the motor 50 so that it may be operated. These contacts 86 and 87 are in series relationship with the coil 51 of the motor 50. The circuit may be traced as follows in Fig. 7: Line 1, motor 50, lead 92, arm 84, contacts 87 and 86, arm 83, lead 93, contact 21, relay arm 19 (should it be in dotted line position as assumed), and lead 94 connected to arm 19, to neutral.

Normally, upon the closing of contact 21 by the arm 19, the motor 50 will operate to bring the arms 24 and 30 to upper contacting position as illustrated in Fig. 4. At this position, the cam 81 will have rotated through 180°, in the clockwise direction indicated by the arrow 95. The radius of the cam 81 is sufficient through this half cycle to maintain the contacts 86 and 87 closed. However, as indicated at 96, there is a sudden decrease in the radius of the cam 81, at an angular position corresponding to upper contacting position of the arms 24 and 30. Thus, the contacts 86 and 87 will be freed, as shown in Fig. 4, and the motor circuit interrupted, thereby maintaining closed the contacts 36 and 34 as well as 25 and 33. As hereinbefore described, the Load No. 2 will therefore operate on a reduced voltage, and power thereto will be reduced as the load requirements of Load No. 1 are large.

Since the current relay R has delicately engaging contacts, which may chatter, it must be insured that the arms 24 and 30 never remain in an intermediate position for any appreciable time, as well as insuring that once having left contact 26, for instance, contact 26 is carried to its uppermost position.

For this purpose, use is made of the arm 85 and its contact 88. This contact 88 is adapted to close a circuit parallel with the back relay contact 21 upon an initial movement of the motor 50.

As shown most clearly in Figs. 4 and 5, the contact 26 is so positioned with respect to the arm 24 that before contact 25 leaves contact 26, a substantial rotation of the eccentric 66 is necessary. In addition to insuring that contact is made despite possible angular deviations due to the inertia of the system, this relationship insures that the contact 25 will not leave contact 26 until the paralleling circuit through contact 88 of arm 85 is achieved, and thus it is thereby insured that the arms will complete a half cycle to upper contacting position despite possible chattering of the arm 19 of the relay R. This relationship causes a slight flexure of arm 24 as shown in Fig. 5.

As shown in Fig. 7, as well as Fig. 5, upon the initiation of this half cycle, contact 88 is out of contact with contact 87 as the operating radius of the cam 81 at this position is insufficient to cause engagement. However, the radius of the cam increases, and beginning at the crest 97, the paralleling contact 88 engages contact 87 and is in conducting relation therewith. It is necessary, of course, that the motor be rotated by the controlling action of the current relay arm 19 alone to cause this paralleling contact to be operative. This may, of course, be intermittently done without harm, for the particular positioning of the contact 26 is such that contact 25 will not leave until there is an initial rotation of the eccentric 66. The crest 97 is so angularly located that the paralleling contact 88 will be established before the contact 25 leaves contact 26. It is thereby insured that the arm 24 will complete the half cycle to upper contacting position illustrated in Fig. 4, once started.

The circuit for the motor 50 through this paralleling contact may be traced as follows: line 1, motor 50, connection 92, arm 84, contact 87, and 88 respectively, arm 85, connection 98 to neutral.

After the motor mechanism 49 has completed this half cycle to upper contacting position, the motor circuit is conditioned so that upon a decrease in the load 1, the mechanism 49 will operate to return the arms 24 and 30 to lower contacting position.

For this purpose, use is made of another circuit controller mechanism 99 entirely similar to the circuit controller mechanism 82, but operating substantially 180° out of phase therefrom.

Operatively associated with this circuit controller mechanism 99 is a cam 100 having a shape similar to cam 81. However, the cam 100 is mounted on the shaft 67 such that it will condition the motor 50 for operation when the arms 24 and 30 are in the upper contacting position of Fig. 4.

This cam 100 is mounted adjacent the cam 81 on the shaft 67.

The circuit controller mechanism 99 comprises three spring arms 101, 102, and 103 having contacts 104, 105, and 106 respectively. The arms 101, 102, and 103 are similarly insulatedly supported on the block 89 adjacent the arms 83, 84, and 85 of the circuit controller mechanism 82.

In the free position of these arms 101, 102, and 103, as shown in Fig. 7, the contacts are out of engagement. In the position of the mechanism illustrated in Fig. 7, the motor 50 has positioned the arms 24 and 30 to the lower contacting position. This has been accomplished by the aid of the circuit controller mechanism 99, the circuit through the motor having been interrupted by a sharp decrease in the radius of the cam 100.

Let it be assumed, however, that the motor 50 has initiated that half cycle in which contact 25 is moved to the upper contacting position, as hereinbefore described. It will be noted that the radius of the cam 100 remains small until the paralleling circuit through contact 88 is established. Thus only as soon as the contact 88 insures movement of contact 25 to upper contacting position, will an increased radius of the cam 100, as at 111, cause the contacts 104 and 105 to be engaged, and upon the separation of the contacts 86 and 87 corresponding to upper contacting position, the motor 50 is conditioned for operation should arm 19 indicate a decrease in the load to load No. 1, through circuit controller mechanism 99.

Assuming such a position (Fig. 4), the contacts 104 and 105 are closed, as hereinbefore described, and any decrease in load through load No. 1 will cause the motor to operate. The circuit for this operation may be traced as follows: line 1, motor 50, leads 92 and 107, arm 102, contacts 105 and 104 respectively, arm 101, line 108, contact 20, arm 19, and connection 94 to neutral.

The motor 50 thereby causes the eccentric 66 to move arms 24 and 30 from upper contacting position of Fig. 4 to the lower contacting position of Figs. 5 and 7, the radius of the cam 100 being sufficient to maintain uninterrupted contact between the contacts 104 and 105. However, at the position corresponding to the lower contacting position of the arms 24 and 30, there is a sudden reduction in the radius of the cam 100, as at 109, freeing the contacts 104 and 105, thereby interrupting the circuit for the motor 50. As hereinbefore described, the lower contacting position corresponds to full voltage being applied to the load No. 2.

It will be noted as the motor 50 completes this half cycle, the cam 81 is positioned such that contacts 86 and 87 are in engagement, conditioning the motor circuit so that upon an increase in the load, another first half cycle of operation may be effected, and the load No. 2 switched to upper contacting position, as hereinbefore described.

The third contacting arm 103 is entirely similar in structure and function to the arm 85. The contact 106 carried by arm 103 is similarly adapted to parallel the front contact 20 of current relay R upon a sufficient initial movement of the motor 50 caused by the contact 20 being engaged.

As shown most clearly in Figs. 4 and 5, the contact 33 is positioned with respect to the arm 24 in a manner similar to contact 26. Thus, a substantial initial rotation of the eccentric 66 is necessary before contact 25 leaves the contact 33.

Contact 106 is adapted to be in conducting relationship with contact 104 after a small initial movement of the motor mechanism 49. For this purpose, similar to cam 81, the radius of the cam 100 increases until at the crest 110, all contacts are in conducting relationship. This relationship, as before, exists before the contact 25 leaves the contact 33.

It will be noted that contacts 86 and 87 are made only after it is insured by paralleling contact 106 that contact 25 is carried to lower contacting position.

The paralleling circuit may be traced as follows: line 1, motor 50, connections 92 and 107, arm 102, contacts 105 and 106, and connection 98 to neutral.

It is thus seen that an efficient control system is achieved whereby the Load No. 2 may be efficiently switched between a lower and a higher voltage source according to the load passing to Load No. 1.

By the aid of the switch SS, it may optionally be provided that the load No. 2 is switched between a higher voltage to zero voltage, reducing the power through load No. 2 to zero rather than to twenty-five per cent.

The load regulator as thus far described may be readily adapted to perform load switching not only in response to actual load conditions of load No. 1, but to external temperature conditions as well. Thus, for instance, even if the load to load No. 1 be small, it may still be desirable for power consumption to be reduced when external temperature conditions are such that this may be done without serious inconvenience.

For this purpose, thermostatic control mechanism 112 may be inserted in line 108 cooperating in series relationship with contact 20 and either of the circuit controller mechanisms 82 or 99 in a manner to be hereinafter described. The control achieved by arm 19 with respect to contact 21 to switch the load No. 2 to a lower voltage in response to an increased load is not disturbed, and thus irrespective of the conditions of the thermostatic control mechanism 112, the voltage to load No. 2 will be reduced as the load to load No. 1 reaches the prescribed value.

Directing attention more particularly to the thermostatic control mechanism, a switch S is adapted to insert in the control circuit, any of a number of thermostats 113 and 114. In the dotted line position, the switch S is shown as connecting one such thermostat 113 in the control circuit.

The thermostat 113 has a bimetallic arm 115 which is adapted to engage either of a pair of contacts 116 or 117, such as by appropriate snap action mechanisms (not shown).

The thermostat 113 may be a day thermostat, for instance, and if it is in the position shown, indicating a sufficiently low temperature, and hence the possible need of using space heaters, a circuit is established to the circuit controller mechanism 99 so that the motor 50 may operate to bring contacts 25 and 36 to full voltage or lower contacting position.

The circuit for such condition may be traced as follows: line 1, motor 50, connections 92 and 107, arm 102, contacts 105 and 104, arm 101, connections 118 and 119, contact 116, bimetallic arm 115, connection 120, switch S, connection 108, contact 20, arm 19, and connection 94 to neutral.

If the thermostat 113 indicates a sufficiently high temperature, such that the space heating load may be reduced without serious inconvenience, a circuit is established to the circuit controller mechanism 82 so that the motor 50 may operate to bring contacts 25 and 36 to a lower voltage, or the upper contacting position.

The circuit for such condition may be traced as follows: line 1, motor 50, connection 92, arm 84, contacts 87 and 86, arm 83, connections 121 and 122, contact 117, bimetallic arm 115, connection 120, switch S, connection 108, contact 20, relay arm 19, connection 94 to neutral.

It is thus readily apparent that this thermostatic control mechanism may readily be incorporated in the load regulator system, further conserving power by selecting, according to temperature conditions, whether circuit controller mechanism 99 or 82 should be operative, when relay arm 19 indicates even a low load requirement of load No. 1.

The thermostat 114 may be, for instance, a night thermostat, which may be inserted in the circuit in place of the thermostat 113, as commonly a lower temperature may be tolerated without inconvenience during the night.

Automatic timer devices may be effectively used to switch either of the thermostats into operative association.

The inventor claims:

1. In a load regulating system for a three-wire source in which a low voltage and a high voltage for supplying electrical energy consuming loads are available: means for supplying a first load from the system; a switch for connecting the second load either to the high voltage or the low voltage; a member for operating the switch and movable to two positions corresponding to the high voltage or the low voltage connections; a motor for moving the member to either position; and means responsive to an increase in the first load for operating the motor to cause the switch to assume the low voltage position, and responsive to a decrease in the first load to operate the motor to cause the switch to assume the high voltage position.

2. In a load regulating system for a three-wire source in which a high voltage and a low voltage for supplying electrical energy consuming loads are available: means for supplying a first load from the system; switch means for connecting a second load to either the high or the low voltage; a motor operated mechanism for operating said switch means; and means responsive to a predetermined condition for operating the motor to cause the switch to assume the low voltage position, and responsive to another predetermined condition for operating the motor to cause the switch to assume the high voltage position.

3. In a load regulating system for a three-wire source in which a high voltage and a low voltage for supplying electrical energy consuming loads are available: means for supplying a first load from the system; switch means for connecting a second load to either the high or the low voltage; a motor operated mechanism for operating said switch means; and means responsive to either a large value of the first load or to a first predetermined condition for operating the motor to cause the switch to assume the low voltage position, and responsive to a second predetermined condition together with a low value of the first load to operate the motor to cause the switch to assume the high voltage position.

4. In a load regulating system for a three-wire source in which a high voltage and a low voltage for supplying electrical energy consuming loads are available: means for supplying a first load from the system; switch means for connecting a second load to either the high voltage or the low voltage; a motor operated mechanism for operating said switch means; a circuit means controlling the operation of said motor operated mechanism, including a pair of circuit controllers each having a circuit opening and a circuit closing position; movable means for closing the first of said pair of circuit controllers when said switch means is at high voltage position, and opening said first circuit controller when said switch means is in low voltage position, and for closing the second of said pair of circuit controllers when said switch means is in low voltage position, and opening said second circuit controller when said switch means is in high voltage position; and circuit means responsive to the value of the load supplied to said first load for connecting either of said circuit controllers to a source of electrical energy.

5. In a load regulating system for a three-wire source in which a high voltage and a low voltage for supplying electrical energy consuming loads are available: means for supplying a first load from the system; switch means for connecting a second load to either the high or the low voltage, a motor operated mechanism for operating said switch means; circuit means controlling the operation of said motor operated mechanism, including a circuit controller having a circuit opening and a circuit closing position; movable means for opening said circuit controller when said switch means reaches a low voltage position, and for closing said circuit controller before said switch means reaches high voltage position; means responsive to one condition for supplying electrical energy to said motor operated mechanism through said circuit controller to move said switch means to low voltage position; and means responsive to another condition to move the said switch means from low voltage position to high voltage position.

6. In a load regulating system for a three-wire source in which a high voltage and a low voltage for supplying electrical energy consuming loads are available: means for supplying a first load from the system; switch means for connecting a second load to either the high or the low voltage; a motor operated mechanism for operating said switch means; circuit means controlling the operation of said motor operated mechanism, including a circuit controller having a pair of relatively movable contacts; cam means operated by said motor operated mechanism closing said contacts when said switch means is in high voltage position as well as when the switch means is moving to low voltage position, but opening said contacts when said switch means is at low voltage position; means responsive to a predetermined value of the first load to supply said mechanism with electrical energy through said circuit controller; and means responsive to another predetermined value of the first load to move said switch means from low voltage to high voltage position.

7. In a load regulating system for a three-wire source in which a high voltage and a low voltage for supplying electrical energy consuming loads are available: means for supplying a first load from the system; switch means for connecting a second load to either the high or the low voltage; a motor operated mechanism for operating said switch means; circuit means controlling the operation of said motor operated mechanism, including a circuit controller having a pair of relatively movable contacts; cam means operated by said motor operated mechanism opening said contacts when said switch means reaches low voltage position, but closing said contacts before said switch means reaches high voltage position; means responsive to a predetermined value of the first load to supply said mechanism with electrical energy through said circuit controller; and means responsive to another predetermined value of the first load to move said switch means from low voltage to high voltage position.

8. In a load regulating system for a three-wire source in which a high voltage and a low voltage for supplying electrical energy consuming loads are available: means for supplying a first load from the system; switch means for connecting a second load to either the high or the low voltage; a motor operated mechanism for operating said switch means; circuit means controlling the operation of said motor operated mechanism, including a circuit controller having a pair of relatively movable contacts that are closed when said switch means is at high voltage position and when the switch means is moving to low voltage position, but open when said switch means reaches low voltage position; means responsive to a predetermined value of the first load adapted to supply said mechanism with electrical energy through said circuit controller; circuit means operated in response to an initial movement of said motor operated mechanism to move said switch means from high voltage position to parallel said load responsive means and supply electrical energy to said mechanism; and means responsive to another predetermined value of the first load to move said switch means from low voltage position to high voltage position.

9. In a load regulating system for a three-wire source in which a high voltage and a low voltage for supplying electrical energy consuming loads are available: means for supplying a first load from the system; switch means for connecting a second load to either the high or the low voltage; a motor operated mechanism for operating said switch means; circuit means controlling the operation of said motor operated mechanism, including a circuit controller having a pair of contacts; movable means operated by said motor operated mechanism closing said contacts when said switch means is at high voltage position and when the switch means is moving to low voltage position, but opening said contacts when said switch means is at low voltage position; means responsive to a predetermined value of the first load to supply said mechanism with electrical energy through said circuit controller; circuit means operated by said movable means upon an initial movement of said mechanism from high voltage position to supply electrical energy to said mechanism independently of said load responsive mechanism; and means responsive to another predetermined value of the first load to move said switch means from low voltage position to high voltage position.

10. In a load regulating system for a three-wire source in which a high voltage and a low voltage for supplying electrical energy consuming loads are available: means for supplying a first load from the system; switch means for connecting a second load to either the high or the low voltage; a motor operated mechanism for operating said switch means; circuit means controlling the operation of said motor operated mechanism, including a circuit controller having a pair of relatively movable contacts that are opened when said switch means reaches low voltage position, and that is closed before said switch means reaches high voltage position; means responsive to one condition for supplying electrical energy to said motor operated mechanism through said circuit controller to move said switch means to low voltage position; circuit means operated in response to an initial movement of said motor operated mechanism to move said switch means from high voltage position to parallel said condition responsive means and supply electrical energy to said mechanism; and means responsive to another condition to move said switch means from low voltage position to high voltage position.

11. In a load regulating system for a three-wire source in which a high voltage and a low voltage for supplying electrical energy consuming loads are available: means for supplying a first load from the system; switch means for connecting a second load to either the high or the low voltage; a motor operated mechanism for operating said switch means; circuit means controlling the operation of said motor operated mechanism, including a circuit controller having a pair of contacts; movable means operated by said motor operated mechanism closing said contacts when said switch means is at high voltage position and when the switch means is moving to low voltage position, but opening said contacts when said switch means is at low voltage position; means responsive to a predetermined value of the first load to supply said mechanism with electrical energy through said circuit controller; circuit means operated by said movable means upon an initial movement of said mechanism from high voltage position to supply electrical energy to said mechanism independently of said load responsive mechanism, said circuit means being operable only until said switch means reaches low voltage position; and means responsive to another predetermined value of the first load to move said switch means from low voltage position to high voltage position.

12. In a load regulating system for a three-wire source in which a high voltage and a low voltage for supplying electrical energy consuming loads are available: means for supplying a first load from the system; switch means for connecting a second load to either the high or the low voltage; a motor operated mechanism for operating said switch means; said mechanism including a rotatable shaft, an eccentric on the shaft, a link member connected to said switch member and operated by said eccentric; circuit means controlling the operation of said motor including a pair of circuit controllers each having a circuit opening and a circuit closing position; movable means for opening the first of said pair of circuit controllers when said switch means is at low voltage position, and closing said first circuit controller before said switch means reaches high voltage position, and for opening the second of said pair of circuit controllers when said switch means is at high voltage position, and closing said second circuit controller before said switch means reaches low voltage position; and circuit means responsive to the value of the load supplied to said first load for connecting either of said circuit controllers to a source of electrical energy.

13. In a load regulating system for a three-wire source in which a high voltage and a low voltage for supplying electrical energy consuming loads are available: means for supplying a first load from the system; switch means for connecting a second load to either the high or the low voltage; a motor operated mechanism for operating said switch means; circuit means controlling the operation of said motor mechanism, including a pair of circuit controllers, each having a pair of contacts, one contact of each circuit controller leading to the motor mechanism, a pair of connections leading from each of the other of the contacts and alternatively connectible to a source of electrical energy; cam means positionable by said motor and actuating said circuit controllers, for closing one of the pair of circuit controllers when said switch means is at high voltage position and when said switch means is moving to low voltage position, but opening said one of the pair of circuit controllers when said switch means reaches low voltage position, and for closing the other of the pair of circuit controllers when said switch means is at low voltage position and when said switch means is moving to high voltage position, but opening the other of the pair of circuit controllers when said switch means reaches high voltage position; and means responsive to the value of the first load for connecting either of the said connections to a source of electrical energy.

14. In a load regulating system for a three-wire source in which a high voltage and a low voltage for supplying electrical energy consuming loads are available: means for supplying a first load from the system; switch means for connecting a second load to either the high or the low voltage; a motor operated mechanism for operating said switch means; said mechanism including a rotatable shaft, an eccentric mounted on said shaft, an apertured member connected to said switch member and adapted to be reciprocated by said eccentric, and a motor for rotating said shaft; circuit means controlling the operation of said motor, including a pair of circuit controllers each having a pair of contacts, one contact of each circuit controller leading to said motor, a pair of connections leading from each of the other of the contacts and alternatively connectible to a source of electrical energy; movable means positionable by said motor, and actuating said circuit controllers, for closing one of the pair of circuit controllers when said switch means is at high voltage position and when said switch means is moving to low voltage position, but opening said one of the pair of circuit controllers when said switch means reaches low voltage position, and for closing the other of the pair of circuit controllers when said switch means is at low voltage position and when said switch means is moving to high voltage position, but opening said other of the pair of circuit controllers when said switch means reaches high voltage position; and means responsive to the value of the first load for connecting either of said connections to a source of electrical energy.

15. In a load regulating system for a three-wire source in which a high voltage and a low voltage for supplying electrical energy consuming loads are available: means for supplying a first load from the system; switch means for connecting a second load to either the high or the low voltage; a motor operated mechanism for operating said switch means; circuit means controlling the operation of said motor mechanism, including a pair of circuit controllers, each having a pair of contacts, one contact of each circuit controller leading to the motor mechanism, a pair of connections leading from each of the other of the contacts and alternatively connectible to a source of electrical energy; a third contact associated with each of said pair of circuit controllers and directly connected to a source of electrical energy; cam means positionable by said motor for actuating said circuit controllers, closing one of the pair of circuit controllers when said switch means is at high voltage position and when said switch means is moving to low voltage position, but opening said one of the pair of circuit controllers when said switch means reaches low voltage position, and closing the other of the pair of circuit controllers when said switch means is at low voltage position and when said switch means is moving to high voltage position, but opening the other of the pair of circuit controllers when said switch means reaches high voltage position; said cam means also connecting said third contact to said one contact of each circuit controller upon an initial operation of said motor mechanism to move said switch means from either of the contacting positions; and means responsive to the value of the first load for connecting either of said connections to a source of electrical energy.

16. In a load regulating system for a three-wire source in which a high voltage and a low voltage for supplying electrical energy consuming loads are available: means for supplying a first load from the system; switch means for connecting a second load to either the high or the low voltage; a motor operated mechanism for operating said switch means; said mechanism including a rotatable shaft, an eccentric on said shaft, an apertured member connected to said switch member and adapted to be reciprocated by said eccentric, and a motor for rotating said shaft; circuit means controlling the operation of said motor, including a pair of circuit controllers each having a pair of contacts, one contact of each circuit controller leading to said motor, a pair of connections leading from each of the other of the contacts and alternatively connectible to a source of electrical energy; a third contact associated with each of said pair of circuit controllers and directly connected to a source of electrical energy; cam means positionable by said motor and actuating said circuit controllers, for opening one of the pair of circuit controllers when said switch means is at low voltage position and closing said one circuit controller before said switch means reaches high voltage position and for opening the other of the pair of circuit controllers when said switch means is at high voltage position and closing said other circuit controller before said switch reaches low voltage position; said cam means also connecting said third contact to said one contact of each circuit controller upon an initiation of the movement of the switch means from either of the contacting positions; and means responsive to the value of the first load for connecting either of the said connections to a source of electrical energy.

17. In a load regulating system for a three-wire source in which a high voltage and a low voltage for supplying electrical energy consuming loads are available: means for supplying a first load from the system; switch means for connecting a second load to either the high or the low voltage; a motor operated mechanism for operating said switch means; circuit means controlling the operation of said motor, including a first and a second circuit controller, each having a pair of contacts, one contact of each circuit controller leading to said motor operated mechanism; a relay having front and back contacts, and an arm movable in response to an increased value of the first load for engaging the back contact and connecting the other contact of said first circuit controller to a source of energy, and movable to front contacting position in response to a decreased value of the first load; and a temperature responsive device adapted to connect the other contact of said second circuit controller to a source of electrical energy in response to a decreased temperature, when said movable arm is in front contacting position, and adapted to connect the other contact of said first circuit controller to a source of energy in response to an increased temperature when said movable arm is in front contacting position.

18. In a load regulating system for a three-wire source in which a high voltage and a low voltage for supplying electrical energy consuming loads are available: means for supplying a first load from the system; switch means for connecting a second load to either the high or the low voltage; a motor operated mechanism for operating said switch means; circuit means controlling the operation of said motor, including a first and a second circuit controller, each having a pair of contacts, one contact of each circuit controller leading to said motor operated mechanism; movable means opening the contacts of said first circuit controller when said switch means reaches low voltage position, and closing said contacts of said first circuit controller before said switch means reaches high voltage position, said movable means also opening the contacts of said second circuit controller when said switch means reaches high voltage position, and closing said contacts of said second circuit controller before said switch means reaches low voltage position; a relay having front and back contacts, and an arm movable in response to an increased value of the first load for engaging the back contact and connecting the other contact of said first circuit controller to a source of energy, and movable to front contacting position in response to a decreased value of the first load; and a temperature responsive device adapted to connect the other contact of said second circuit controller to a source of electrical energy in response to a decreased temperature, when said movable arm is in front contacting position, and adapted to connect the other contact of said first circuit controller to a source of energy in response to an increased temperature when said movable arm is in front contacting position.

19. In a load regulating system for a three-wire source in which a high voltage and a low voltage for supplying electrical energy consuming loads are available: switch means for connecting a load to either the high or the low voltage; a motor operated mechanism for operating said switch means; and thermostatic means responsive to an increased temperature for operating the motor to cause the switch to assume the low voltage position, and responsive to a decreased temperature for operating the motor to cause the switch to assume the high voltage position.

20. In a load regulating system for a three-wire source in which a low voltage and a high voltage for supplying electrical energy consuming loads are available: means for supplying a first load from the system; means normally supplying a first load from the system; means normally supplying a second load from the system with the high voltage; means for switching the second load to the low voltage in response to an increase of the first load to a predetermined value; and supplemental thermostatic means operating in conjunction with said load responsive means to switch the second load to the low voltage position in response to an increased temperature.

21. In a load regulating system for a three-wire source in which a high voltage and a low voltage for supplying electrical energy consuming loads are available: circuit controlling means for connecting a load either to the high voltage or to the low voltage; thermostatic means responsive to an increased temperature for operating said circuit controller to connect said load to the low voltage, and responsive to a decreased temperature for operating the circuit controller to connect said load to the high voltage position.

ARTHUR J. KERCHER.

REFERENCES CITED

The following references are of record in the file of this patent:

UNITED STATES PATENTS

| Number | Name | Date |
|---|---|---|
| 1,743,115 | Clark | Jan. 14, 1930 |
| 2,199,639 | Lee et al. | May 7, 1940 |
| 2,200,989 | Lennox et al. | May 14, 1940 |
| 2,379,415 | Charbonneaux | July 3, 1945 |